(12) United States Patent
Suzuki

(10) Patent No.: US 6,317,715 B1
(45) Date of Patent: Nov. 13, 2001

(54) DIRECTION GUIDANCE FROM VOICE REPRODUCTION APPARATUS AND SYSTEM

(75) Inventor: Yasuhisa Suzuki, Fukushima (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/184,586

(22) Filed: Nov. 3, 1998

(30) Foreign Application Priority Data

Nov. 7, 1997 (JP) .................................................. 9-322429

(51) Int. Cl.[7] .................................................. G09F 25/00
(52) U.S. Cl. .......................... 704/271; 704/258; 701/211; 340/996
(58) Field of Search ............................. 340/996, 825.25, 340/825.49, 825.19; 704/271, 200, 270, 258; 701/211, 209

(56) References Cited

U.S. PATENT DOCUMENTS

| 4,660,022 | * | 4/1987 | Osaka ............................... 340/384.3 |
| 4,935,907 | * | 6/1990 | Friedman ............................ 367/118 |
| 5,144,294 | * | 9/1992 | Alonzi et al. .................... 340/825.49 |
| 5,406,492 | | 4/1995 | Seiichi . |
| 5,461,371 | | 10/1995 | Kanya et al. . |
| 5,508,699 | * | 4/1996 | Silverman ........................... 340/944 |
| 5,606,325 | * | 2/1997 | Masudaya ....................... 342/357.08 |
| 5,806,017 | * | 9/1998 | Hancock ............................ 701/209 |
| 5,929,848 | * | 7/1999 | Albukerk et al. .................... 345/226 |
| 5,950,161 | * | 9/1999 | Kozuma et al. ..................... 704/260 |
| 5,991,722 | * | 11/1999 | Thompson et al. .................. 704/258 |

FOREIGN PATENT DOCUMENTS

| 0672918 A | 9/1995 | (EP) . |
| 2717937 A | 9/1995 | (FR) . |
| 04-032891 | 5/1990 | (JP) . |
| 07-250863 | 1/1995 | (JP) . |
| 96 15517 | 5/1996 | (WO) . |

OTHER PUBLICATIONS

Harry Newton, "Newton's Telecom Dictionary," Flatiron Publishing, Mar. 1998, pp. 756.*

Patent abstracts of Japan, vol. 1997, No. 2, Feb. 28, 1997 and JP 08 263006A (UNITEC KK), Oct. 11, 1996.

European Search Report dated May 2, 2001.

* cited by examiner

Primary Examiner—William Korzuch
Assistant Examiner—Donald L. Storm
(74) Attorney, Agent, or Firm—Dickstein Shapiro Morin & Oshinsky LLP

(57) ABSTRACT

A voice reproduction apparatus and voice reproduction system for providing guide voice corresponding to a moving direction of a user, for example a visually handicapped person, in a theme park or the like. The voice reproduction apparatus comprises: a receiving part for receiving an identifying signal; an identifying signal discriminating part that discriminates the identifying signal received in the receiving part and discriminates a combination of an identifying signal received and an identifying signal received subsequently; a voice data storage part for storing voice data, relating the voice data to the combination of the received identifying signals; a voice reproduction part reproducing the voice data stored in the voice data storage part; and a reproduction control part that reads out, from the voice data storage part, voice data corresponding to the combination discriminated by the identifying signal discriminating part, and causes the voice reproduction part to reproduce the voice data.

11 Claims, 7 Drawing Sheets

DIRECTION GUIDANCE FROM VOICE REPRODUCTION APPARATUS AND SYSTEM

BACKGROUND OF THE INVENTION

1. Field of the Invention

The present invention relates to a voice reproduction apparatus which receives an identifying signal from a transmitting unit and reproduces voice data, and to a voice reproduction system which employs the voice reproduction apparatus.

2. Description of Related Art

In amusement parks, museums, theme parks, etc., portable voice reproduction apparatuses are used for providing vocal announcements such as guidance for respective sites visited. A user takes this voice reproduction apparatus to the front of a desired site or the like, and can listen to voice data such as guidance, explanation, etc. corresponding to that site, using a speaker, a headphone, an earphone, or the like.

A portable voice reproduction apparatus receives an ID signal (identifying signal) sent from a transmitting unit installed in the neighborhood of an exhibit or in a place where voice information is needed. Then, in accordance with the received ID signal, the voice reproduction apparatus reproduces and outputs, through a speaker or an earphone, voice information related to the received ID signal from among a plurality of voice data stored in a memory or the like in advance.

In the above described portable voice reproduction apparatus, it is possible that explanation in a foreign language such as English is recorded in advance for users who can not understand Japanese such as tourists from abroad. Thus, a user can perform key operation to select a reproduction number of an explanation corresponding to a desired site or the like, so as to listen to and understand the explanation in that foreign language.

Japanese Unexamined Patent Application Laid-Open No. 7-250863 discloses a wireless guide system in which a receiver for giving guide information is installed in advance at a site to be visited. When the receiver receives an ID code and a function code sent intermittently from a transmitter carried by a walker, the voice of the guide information is given through a speaker provided in the receiver.

Japanese Unexamined Patent Application Laid-Open No. 4-32891 discloses a method of and an apparatus for guiding a visually handicapped person. According to that method, along a walking path of a visiting site, there are embedded a memory part which stores identifying data corresponding to that place or the like and a transmitting part which transmits data from the memory part, and the data transmitted from the transmitting part is received by a receiving part provided in a tip portion of a white stick or the like carried by a visually handicapped person for selecting and reproducing a guide voice for guiding him.

SUMMARY OF THE INVENTION

In a case where a visually handicapped person carries such a voice guide apparatus as described above, they may lose their sense of direction.

The wireless guide system disclosed in the Japanese Unexamined Patent Application Laid-open No. 7-250863 can guide a walker by voice data. In the case, however, that a plurality of users carrying voice reproduction apparatuses are present in the same place, it is impossible to guide the users individually in accordance with respective users' necessity.

Although, according to the method of and apparatus for guiding a visually handicapped person disclosed in the Japanese Unexamined Patent Application Laid-open No. 4-32891, voice data can be used to guide a person, it is expensive to embed the equipment in a road. Further, with this construction of the embedded and fixed equipment, the guide path for users carrying the voice reproduction apparatuses is limited in its flexibility, and it is not easy to change the guide path.

An object of the present invention is to provide a voice reproduction apparatus and a voice reproduction system for reproducing a guide voice data corresponding to a moving direction of a user carrying the voice reproduction apparatus, which reproduces a voice data stored in advance in a storage part, being related to an identifying signal received.

Another object of the present invention is to provide a voice reproduction apparatus and voice reproduction system such that, even when a visually handicapped person uses them, he can recognize his moving direction using the guide voice.

According to a first embodiment of the present invention, a voice reproduction apparatus comprises:

a receiving part for receiving an identifying signal;

an identifying signal discriminating part for discriminating a combination of a previous identifying signal received previously by said receiving part and a subsequent identifying signal received by the receiving part next to said previous identifying signal;

a voice data storage part for storing a voice data, relating said voice data to said combination of identifying signals;

a voice reproduction part for reproducing said voice data stored in said voice data storage part; and a reproduction control part for controlling reproduction so that said voice reproduction part reproduces a voice data stored in said voice data storage part and corresponding to a combination of identifying signals discriminated by said identifying signal discriminating part.

With the voice reproduction apparatus of the first embodiment, it is possible to select and reproduce voice data corresponding to a user's moving direction, based on a combination of identifying signals in consideration of their receiving order as the user moves.

According to a second embodiment of the present invention, a voice reproduction apparatus comprises:

a receiving part for receiving an identifying signal;

an identifying signal discriminating part for judging if the identifying signal received by said receiving part is a reference-point identifying signal for setting a reference point or a direction identifying signal for indicating a direction, and discriminating a combination of said reference-point identifying signal and said direction identifying signal;

a voice data storage part for storing a voice data, relating said voice data to a combination of said reference-point identifying signal and said direction identifying signal;

a voice reproduction part for reproducing said voice data stored in said voice data storage part; and a reproduction control part for controlling reproduction so that said voice reproduction part reproduces a voice data stored in said voice data storage part and corresponding to a combination of said reference-point identifying signal and said direction identifying signal, said combination being discriminated by said identifying signal discriminating part.

With the voice reproduction apparatus of the second embodiment, it is possible to select and reproduce voice data corresponding to a user's moving direction, based on a combination of a received reference-point identifying signal and a received direction identifying signal.

According to a third embodiment of the present invention, a voice reproduction apparatus comprises:

a receiving part for receiving an identifying signal;

an identifying signal discriminating part for judging if the identifying signal received by said receiving part is a direction identifying signal for indicating a direction or a reference-point identifying signal for regulating said direction identifying signal and setting a reference point, judging if said direction identifying signal is a regulated direction identifying signal or not, and discriminating a combination of said reference-point identifying signal and said regulated direction identifying signal;

a voice data storage part for storing a voice data, relating said voice data to a combination of said reference-point identifying signal and said regulated direction identifying signal;

a voice reproduction part for reproducing said voice data stored in said voice data storage part; and a reproduction control part for controlling reproduction so that said voice reproduction part reproduces a voice data stored in said voice data storage part and corresponding to a combination of said reference-point identifying signal and said regulated direction identifying signal, said combination being discriminated by said identifying signal discriminating part.

With the voice reproduction apparatus of the third embodiment, it is possible to select and reproduce voice data corresponding to a user's moving direction, based on a regulated direction identifying signal regulated by a received reference-point identifying signal.

According to a fourth embodiment of the present invention, a voice reproduction apparatus is any one of the above-described first through third embodiments, and a detachable storage medium is used as the above-mentioned voice data storage part.

In the fourth embodiment of the present invention, a storage medium can be exchanged in accordance with a purpose and use, and it is possible to provide voice data suitable to a user.

According to a fifth embodiment of the present invention, a voice reproduction system comprises:

a plurality of transmitting units, each transmitting an identifying signal; and a voice reproduction apparatus for receiving said identifying signals transmitted from said transmitting units; wherein said voice reproduction apparatus comprises:

a receiving part for receiving said identifying signal;

an identifying signal discriminating part for discriminating a combination of a previous identifying signal received previously by said receiving part and a subsequent identifying signal received by the receiving part next to said previous identifying signal;

a voice data storage part for storing a voice data, relating said voice data to said combination of identifying signals;

a voice reproduction part for reproducing said voice data stored in said voice data storage part; and a reproduction control part for controlling reproduction so that said voice reproduction part reproduces a voice data stored in said voice data storage part and corresponding to a combination of identifying signals discriminated by said identifying signal discriminating part.

With the voice reproduction apparatus of the fifth embodiment, it is possible to select and reproduce voice data corresponding to a user's moving direction, based on a combination of identifying signals in consideration of their receiving order as the user moves.

According to a sixth embodiment of the present invention, a voice reproduction system comprises:

a reference-point transmitting unit for transmitting a reference-point identifying signal, i.e., an identifying signal for setting a reference point;

a plurality of direction transmitting units, each for transmitting a direction identifying signal, i.e., an identifying signal for indicating a direction; and a voice reproduction apparatus for receiving said identifying signals transmitted from said reference-point transmitting unit and said direction transmitting units; wherein said voice reproduction apparatus comprises:

a receiving part for receiving said identifying signals;

an identifying signal discriminating part for judging if the identifying signal received by said receiving part is a reference-point identifying signal or a direction identifying signal, and discriminating a combination of said reference-point identifying signal and said direction identifying signal;

a voice data storage part for storing a voice data, relating said voice data to a combination of said reference-point identifying signal and said direction identifying signal;

a voice reproduction part for reproducing said voice data stored in said voice data storage part; and a reproduction control part for controlling reproduction so that said voice reproduction part reproduces a voice data stored in said voice data storage part and corresponding to a combination of said reference-point identifying signal and said direction identifying signal, said combination being discriminated by said identifying signal discriminating part.

With the voice reproduction apparatus of the sixth embodiment, it is possible to select and reproduce voice data corresponding to a user's moving direction, based on a combination of a received reference-point identifying signal and a received direction identifying signal.

According to a seventh embodiment of the present invention, a voice reproduction system comprises:

a plurality of direction transmitting units, each for transmitting a direction identifying signal, i.e., an identifying signal indicating a direction; and a reference-point transmitting unit for regulating said direction identifying signal and for transmitting a reference-point identifying signal, i.e., an identifying signal for setting a reference point;

a voice reproduction apparatus for receiving said identifying signals transmitted from said reference-point transmitting unit and said direction transmitting units; wherein said voice reproduction apparatus comprises:

a receiving part for receiving said identifying signals;

an identifying signal discriminating part for judging if the identifying signal received by said receiving part is a direction identifying signal or a reference-point identifying signal, judging if said direction identifying signal is regulated direction identifying signal or not, and discriminating a combination of said reference-point identifying signal and said regulated direction identifying signal;

a voice data storage part for storing a voice data, relating said voice data to a combination of said reference-point identifying signal and said regulated direction identifying signal;

a voice reproduction part for reproducing said voice data stored in said voice data storage part; and a reproduction control part for controlling reproduction so that said voice reproduction part reproduces a voice data stored in said voice data storage part and corresponding to a combination of said reference-point identifying signal and said regulated direction identifying signal, said combination being discriminated by said identifying signal discriminating part.

With the voice reproduction apparatus of the seventh embodiment, acceptable direction identifying signals are limited by a received reference-point identifying signal, and it is possible to select and reproduce voice data corresponding to a user's moving direction.

According to an eighth embodiment of the present invention, a voice reproduction system is the above-described fifth embodiment, and further comprises a power unit for supplying electric power for said transmitting units, said power unit comprises: a power supply part; an auxiliary power supply part; a power breakdown detection part for detecting power breakdown or voltage reduction in said power supply part; and a switching part for switching between said power supply part and said auxiliary power supply part; and said system is controlled so that said switching part is switched from said power supply part to said auxiliary power supply part, when said power breakdown detection part detects power breakdown or voltage reduction in said power supply part.

With the voice reproduction system of the eighth embodiment, it is possible to prevent the voice reproduction system from stopping operation owing to power breakdown in a transmitting unit that transmits an identifying signal.

According to a ninth embodiment of the present invention, a voice reproduction system is the above-described sixth or seventh embodiment, and further comprises a power unit for supplying electric power for said reference-point transmitting unit and said direction transmitting units, and said power unit comprises: a power supply part; an auxiliary power supply part; a power breakdown detection part for detecting power breakdown or voltage reduction in said power supply part; and a switching part for switching between said power supply part and said auxiliary power supply part; and said system is controlled so that said switching part is switched from said power supply part to said auxiliary power supply part, when said power breakdown detection part detects power breakdown or voltage reduction in said power supply part.

With the voice reproduction system of the ninth embodiment, it is possible to prevent the voice reproduction system from stopping operation owing to power breakdown in a reference-point transmitting unit that transmits a reference-point identifying signal or in a direction transmitting unit that transmits a direction identifying signal.

According to a tenth embodiment of the present invention, a voice reproduction system is any one of the fifth through ninth embodiments, and uses a detachable storage medium as the above-described voice data storage part.

With the voice reproduction system of the tenth embodiment, a storage medium can be exchanged depending on a purpose or use, and it is possible to provide voice data such as guidance corresponding to a user.

DESCRIPTION OF THE PREFERRED EMBODIMENTS

Figure 1:
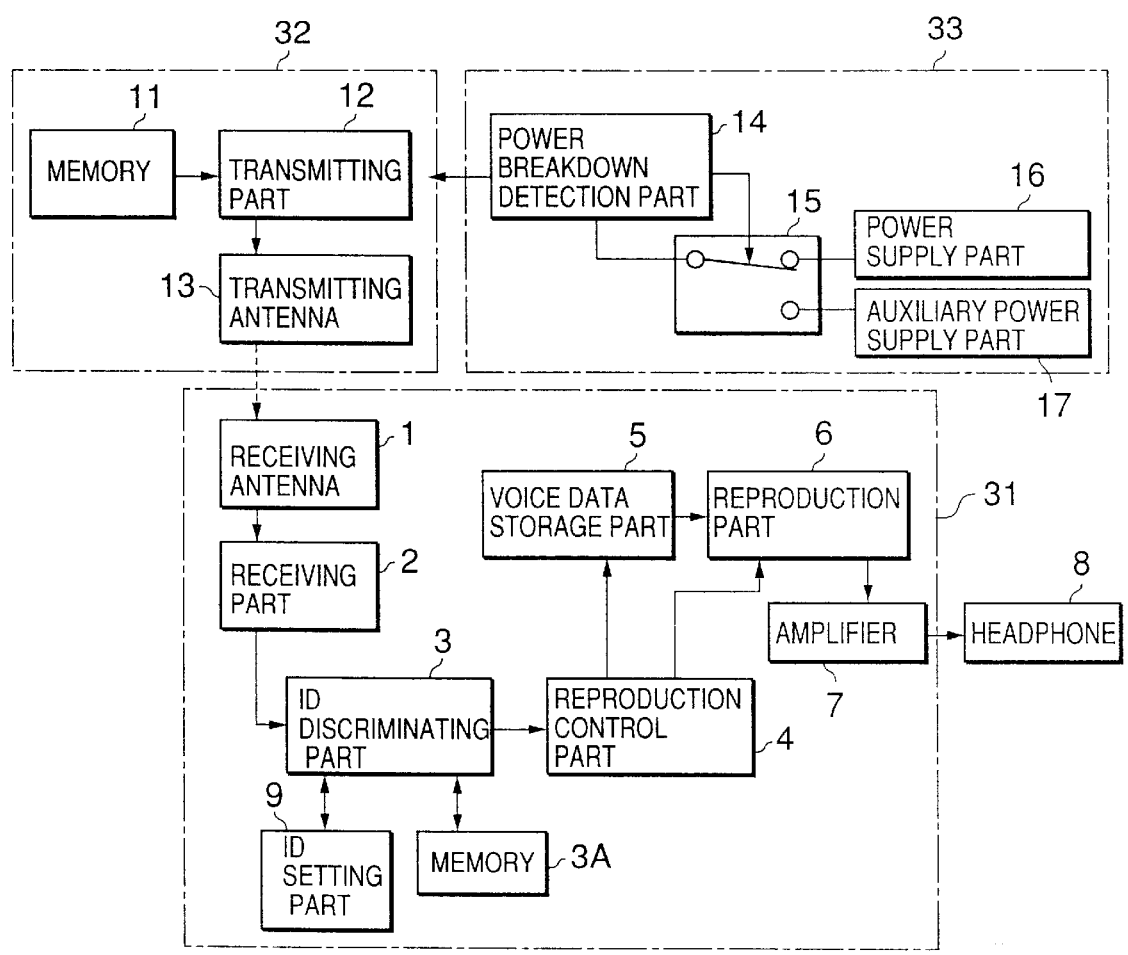
FIG. 1 is a block diagram showing an embodiment of the voice reproduction apparatus and voice reproduction system according to the present invention.

FIG. 1 is a block diagram showing an embodiment of the voice reproduction apparatus and voice reproduction system according to the present invention. A transmitting unit 32 reads an identifying signal (ID signal) from a memory 11 into a transmitting part 12, to transmit it through a transmitting antenna 13. The identifying signal designates a voice data such as music (for example, MGM Background M having a mood appropriate for a guided site), an announcement, guide voice or the like to be reproduced by the voice reproduction apparatus in accordance with the guided site where the transmitting unit 32 is installed. The transmitting unit 32 is connected with a power unit 33 to supply electric power for operating each part of the transmitting unit 32.

In the voice reproduction apparatus 31, an ID signal sent from the transmitting unit 32 is received by a receiving part 2 through a receiving antenna 1. The received signal is sent to an ID discriminating part 3 which discriminates an ID signal. The ID discriminating part 3 judges if the received ID signal is an ID signal for reproduction, which gives instruction of reproduction, or an ID signal for identifying a direction.

The discriminated ID signal is inputted into a reproduction control part 4. When the received signal is an ID signal for reproduction, the reproduction control part 4 selects voice data related to the received ID signal out of voice data stored in a voice data storage part 5 such as music, an announcement, guide voice or the like. The selected voice data is read at a reproduction part 6, amplified to a desired volume level in an amplifier 7, and reproduced and outputted through a headphone 8.

When the ID signal inputted into the ID discriminating part 3 is an ID signal for identifying a direction, the ID signal is stored into a storage part (memory) 3A connected with the ID discriminating part 3.

An ID signal for identifying a direction may be inputted into the ID discriminating part 3, while another ID signal for identifying a direction has already been stored in the memory 3A. In that case, from among voice control data stored and set in an ID setting part 9, the ID discriminating part 3 reads voice control data related to a combination of the ID signal already stored in the memory 3A and the ID signal inputted later. Then, the ID discriminating part 3 instructs the reproduction control part 4 to reproduce voice data which is stored in the voice data storage part 5 and corresponds to that voice control data. Thus, a combination of ID signals for identifying a direction is decided by a moving direction of a user, and depending on that combination, an announcement, guide voice, BGM appropriate for the mood of the guided site, music such as sound effects, or the like can be reproduced.

In a case where the voice reproduction apparatus 31 receives an ID signal for identifying a direction while another ID signal for identifying a direction is not stored in the memory 3A, the voice data corresponding to a moving direction of a user is not reproduced.

Here, to reproduce the voice data corresponding to a moving direction of a user, voice control data for selecting voice data stored in the voice data storage part 5 are set in the ID setting part 9 being related to at least two combinations of ID signals for identifying a direction.

The voice data storage part 5 can be implemented in an exchangeable construction, using a storage medium such as an IC memory card. In the storage medium such as an IC memory card, there may be stored a guide voice or the like (for example, a guide voice in a foreign language, a detailed guide voice, or a guide voice for a visually handicapped person), being related to an ID signal for reproduction and a combination of ID signals for identifying a direction. Depending on purposes etc., desired voice data stored in such a storage medium may be read out, or a storage medium may be exchanged for another one storing desired voice data before the apparatus is supplied to a user.

The voice reproduction system of the present invention comprises the transmitting units 32 installed in a plurality of locations within an area of a theme park or the like. Lack of even one of the transmitting units 32 obstructs presentation of the guide voice corresponding to a direction, or leading a user using the guide voice. Thus, preferably, each transmitting unit may be provided with an auxiliary power supply as a backup of the power supply.

The power unit 33 shown in FIG. 1 supplies operating power for the transmitting unit 32 from a power supply part 16 such as an ordinary commercial power supply or a battery charger. In addition to the power supply part 16, there is provided an auxiliary power supply part 17 for backup. The power supply part 16 and the auxiliary power supply part 17 supply operating power for the transmitting unit 32 through a switch 15 and a power breakdown detection part 14.

Usually, operating power is supplied from the power supply part 16 to the transmitting unit 32. In a case where the power breakdown detection part 14 detects power breakdown or voltage reduction, the power breakdown detection part 14 changes the switch 15 to the auxiliary power supply part 17 so as to supply operating power from the auxiliary power supply part 17 to the transmitting unit 32. As the auxiliary power supply part 17, a battery charger, a private power generator, commercial power supply through another line or the like may be suitably selected and used.

Figure 2:
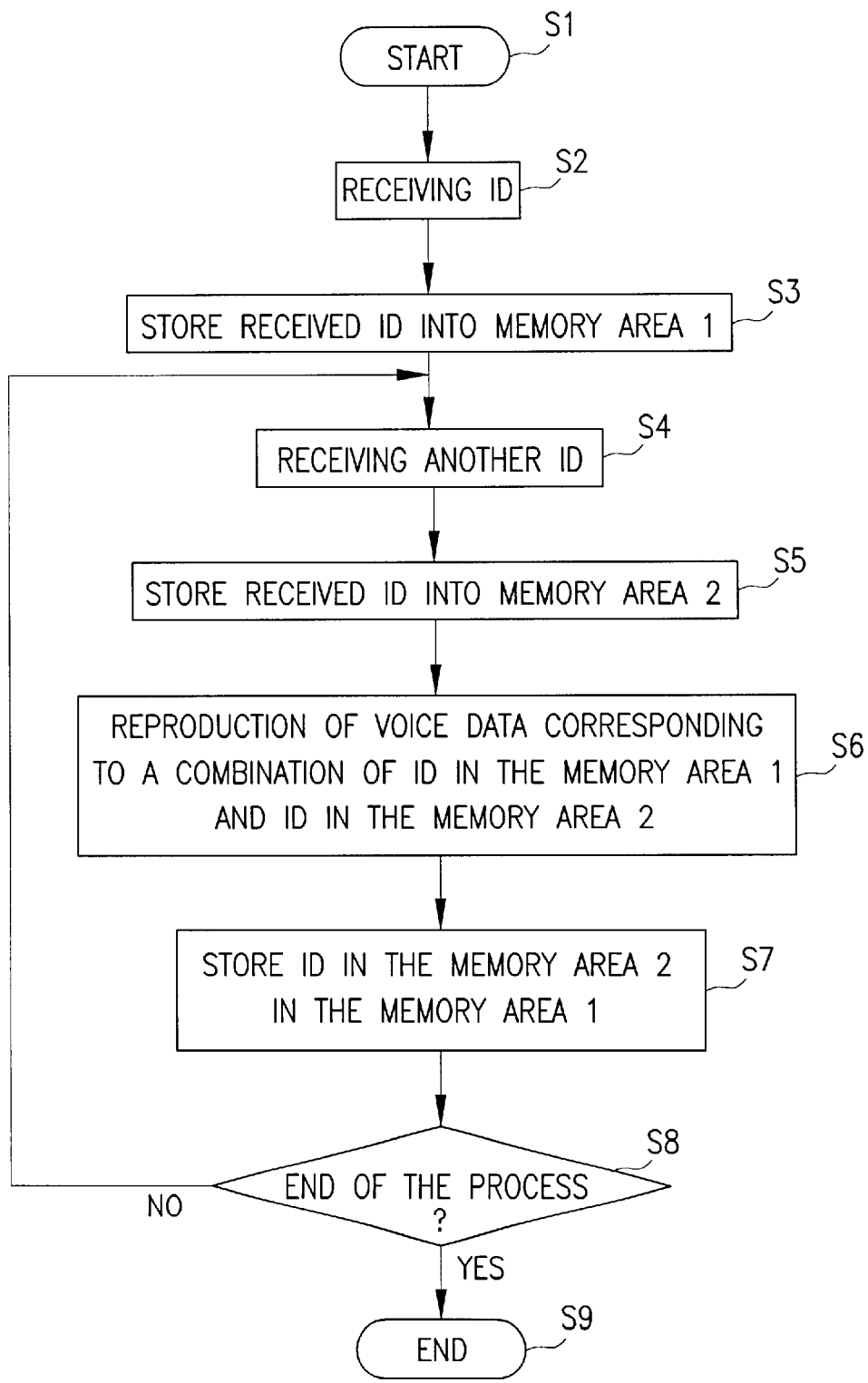
FIG. 2 is a flowchart showing an example of the operation of the voice reproduction apparatus of the present invention.

FIG. 2 is a flowchart showing an example of the operation of the voice reproduction apparatus of the present invention. When the process is started (S1) and an ID signal for identifying a direction is received (S2), the received ID signal is stored into a first storage area (memory area 1) within the memory 3A.

When a user carrying the voice reproduction apparatus 31 shifts his position, and receives another ID signal for identifying a direction (S4), the received ID signal is stored into a second storage area (memory area 2) within the memory 3A (S5).

The ID discriminating part 3 reads voice control data related to a combination of the ID signal stored in the memory area 1 and the ID signal stored in the memory area 2, out of the voice control data set in the ID setting part 9. Then, the ID discriminating part 3 sends an instruction signal to the reproduction control part 4 to reproduce voice data corresponding to the voice control data from among the voice data stored in the voice data storage part 5, and thus voice reproduction is performed (S6). At this time, the ID signal in the memory area 2 is stored into the memory area 1 (S7). If the process operation is not to be finished (NO in S8), the process from S4 through S7 is repeated. When the process operation is to be finished, for example at an end of use (YES in S8), the process is ended (S9).

The voice reproduction apparatus of the present embodiment reproduces voice data such as guidance or the like corresponding to a user's moving direction, based on a combination of a previously-received ID signal for identifying a direction and a next ID signal for identifying a direction. In the step S7 of FIG. 2, the procedure is employed to copy the ID signal in the memory area 2 to the memory area 1, and another ID signal received next is stored into the memory area 2, for advancing identification of received ID signals. Alternatively, the embodiment may employ such a construction that the area for storing another newly-received ID signal is switched between the memory area 2 and the memory area 1. In that case, the process of copying an ID signal from the memory area 2 to the memory area 1 becomes unnecessary.

Figure 3:
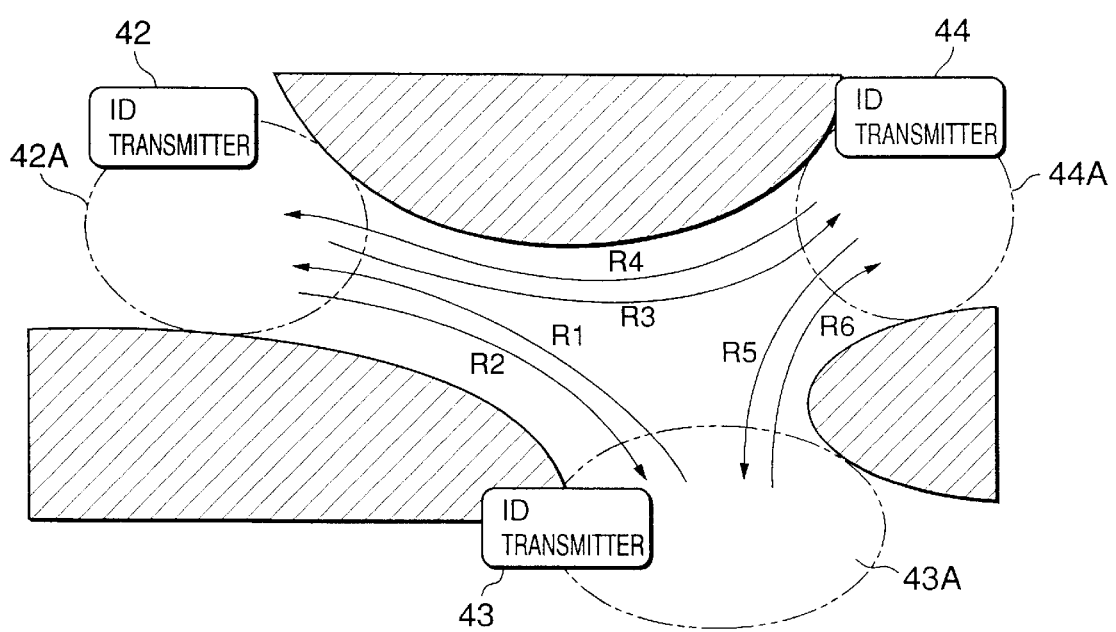
FIG. 3 is a schematic view showing an embodiment of the voice reproduction system of the present invention.

FIG. 3 is a schematic view showing an embodiment of the voice reproduction system according to the present invention. In this embodiment, a guide voice corresponding to equipment in a theme park or the like is reproduced, and ID transmitters 42, 43, 44 are provided in passages in respective branching directions. Here, circles 42A, 43A, 44A shown in the figure illustrate transmission areas of the transmitters 42, 43, 44, respectively.

Now, it is assumed that a user carrying a voice reproduction apparatus is present within the transmission area 42A of the ID transmitter 42 installed in the passage in the site. From the transmission area 42A, it is possible to move in the direction shown by the arrow R2 or in the direction shown by the arrow R3. Moving in the direction of the arrow R2 will lead into the transmission area 43A of the ID transmitter 43. Moving in the direction of the arrow R3 will lead into the transmission area 44A of the ID transmitter 44.

When the user in the ID transmission area 42A goes in the direction of the arrow R2, he enters the ID transmission area 43A of the ID transmitter 43. In that case, user's voice reproduction apparatus 31 reproduces voice data such as a guide voice along the moving direction of the arrow R2, based on the combination of the ID signal from the ID transmitter 42 and the ID signal from the ID transmitter 43.

On the other hand, when the user in the ID transmission area 43A goes in the direction of the arrow R1, he enters the ID transmission area 42A of the ID transmitter 42. In that case, the voice reproduction apparatus 31 reproduces voice data such as a guide voice along the moving direction of the arrow R1, based on the combination of the previously-received ID signal of the ID transmitter 43 and the subsequently-received ID signal of the ID transmitter 42.

Thus, it is possible that, even for the same path, the direction is distinguished depending on the order of receiving ID signals for identifying a direction, and voice data corresponding to each direction is reproduced.

When a user in the ID transmission area 42A goes in the direction of the arrow R3, he enters the ID transmission area 44A of the ID transmitter 44. In that case, the voice reproduction apparatus 31 receives the ID signal of the ID transmitter 44, and reproduces voice data such as guide voice along the moving direction of the arrow R3, based on the combination of the previously-received ID signal of the ID transmitter 42 and the subsequently-received ID signal of the ID transmitter 44.

When a user in the ID transmission area 43A goes in the direction of the arrow R6, he enters the ID transmission area 44A of the ID transmitter 44. In that case, the voice reproduction apparatus 31 receives the ID signal of the ID transmitter 44, and reproduces voice data such as guide voice along the moving direction of the arrow R6, based on the combination of the previously-received ID signal of the ID transmitter 43 and the subsequently-received ID signal of the ID transmitter 44.

When a user in the ID transmission area 44A goes in the direction of the arrow R4 or the arrow R5, the user enters the ID transmission area 42A of the ID transmitter 42 or the ID transmission area 43A of the ID transmitter 43. In that case, the voice reproduction apparatus 31 receives the ID signal of the ID transmitter 42 or 43, and reproduces voice data such as a guide voice along the moving direction of the arrow R4 or R5, based on the combination of the previously-received ID signal of the ID transmitter 44 and the subsequently-received ID signal of the ID transmitter 42 or the ID transmitter 43.

Applying the embodiment shown in FIG. 3 to a plurality of passages, and setting ID transmission areas by installing ID transmitters for identifying directions in respective passages, it is possible to provide a guide voice along a moving direction of a passage for a user carrying a voice reproduction apparatus 31.

A user may be provided with the voice reproduction apparatus 31 in which guides or explanations along a user's moving direction, i.e., guides or explanations on objects existing ahead in the moving direction or on landmarks on the way, are set in advance, so that the user is led to a desired direction.

When a user walks within a site such as a theme park, carrying the voice reproduction apparatus 31, the user can obtain a guide voice along a moving direction. Thus, through the guide voice, the user himself can know in which direction he is walking.

Figure 4:
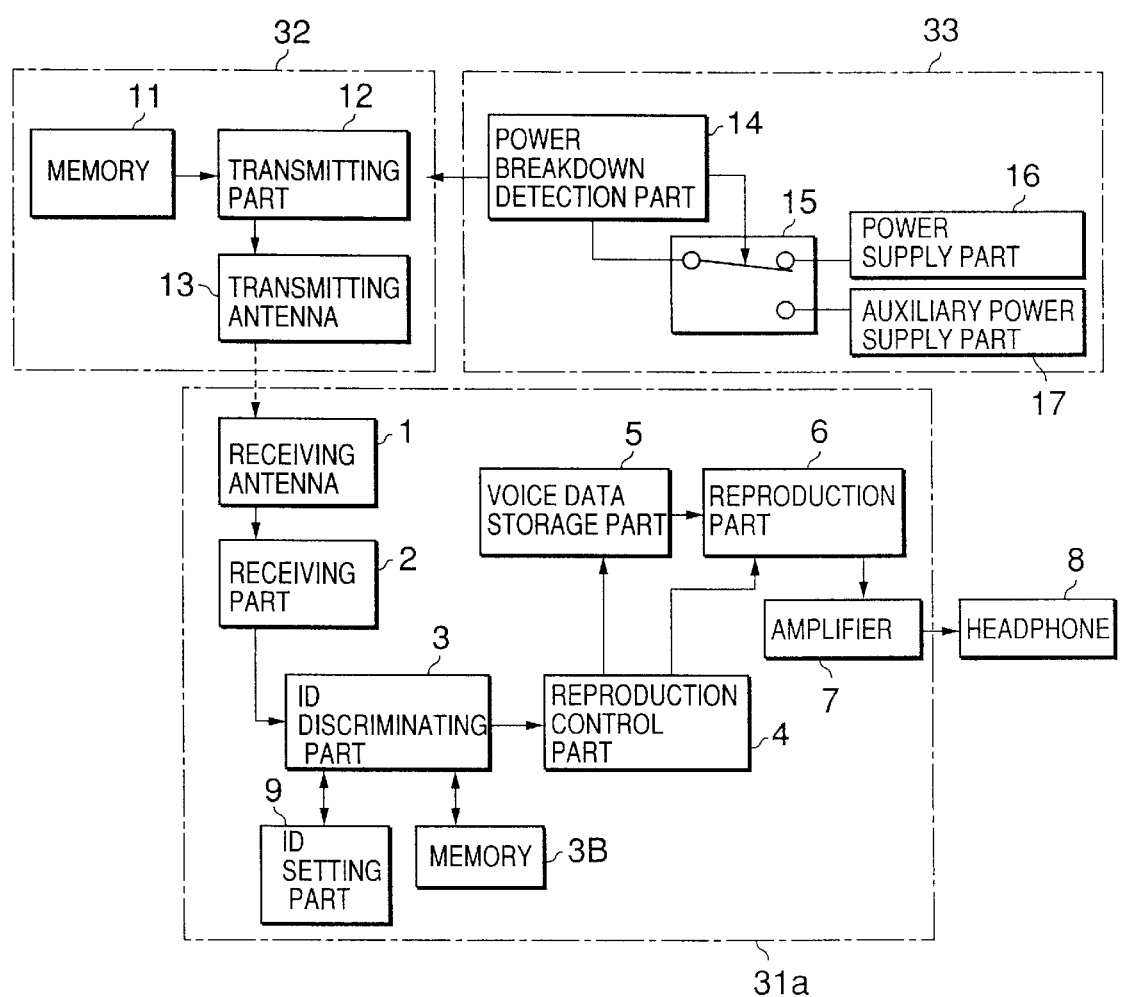
FIG. 4 is a block diagram showing another embodiment of the voice reproduction apparatus and voice reproduction system according to the present invention.

FIG. 4 is a block diagram showing another embodiment of the voice reproduction apparatus and voice reproduction system according to the present invention. The transmitting unit 32 reads an identifying signal (ID signal) from the memory 11 into the transmitting part 12, to transmit it through the transmitting antenna 13. The identifying signal designates a voice data such as music, an announcement, guide voice or the like to be reproduced by the voice reproduction apparatus 31a in accordance with a guided site where the transmitting unit 32 is installed.

ID signals used in the present embodiment are an ID signal for reproduction for instructing reproduction, a reference-point identifying signal (reference-point ID signal) used as base positional information (reference-point information) for identifying a moving direction of a user of the voice reproduction apparatus 31a, and a direction identifying signal (direction ID signal) for indicating directional information in relation to the reference-point information.

In the voice reproduction apparatus 31a, an ID signal sent from the transmitting unit 32 is received by the receiving part 2 through the receiving antenna 1. The received signal is sent to the ID discriminating part 3 which discriminates an ID signal. The ID discriminating part 3 judges if the received ID signal is an ID signal for reproduction, which gives an instruction of reproduction, a reference-point ID signal, or a direction ID signal.

When the received signal is an ID signal for reproduction, the reproduction control part 4 selects voice data such as music, an announcement, guide voice or the like, related to the received ID signal out of voice data stored in the voice data storage part 5. The selected voice data is read into the reproduction part 6, amplified to a desired volume level in the amplifier 7, and reproduced and outputted through the headphone 8.

When the ID signal discriminated in the ID discriminating part 3 is a reference-point ID signal, the reference-point ID signal is stored in a storage part (memory) 3B provided being connected with the ID discriminating part 3.

When the ID signal inputted into the reproduction control part 4 is a direction ID signal, the ID discriminating part 3 reads out the reference-point ID signal stored in the memory 3B. Then, the ID discriminating part 3 reads out voice control data related to the combination of this direction ID signal and reference-point ID signal, out of voice control data stored and set in the ID setting part 9, and instructs the reproduction control part 4 to reproduce voice data corresponding to the voice control data out of the voice data stored in the voice data storage part 5. Thus, it is possible to reproduce an announcement, guide voice, music, or the like corresponding to a direction decided by the combination of the reference-point ID signal and the direction ID signal.

In a case where a reference-point ID signal is not stored in the memory 3B and the voice reproduction apparatus 31a receives a direction ID signal, it does not perform reproduction of guide voice corresponding to a user's moving direction.

Here, a reference-point ID signal is provided for reproducing voice data based on a combination of the reference-point ID signal and a direction ID signal. In addition, data of ID signals for reproduction may be stored and set in the ID setting part 9, to reproduce the data in relation to a reference-point ID signal. In that case, when a reference-point ID signal is received, the voice reproduction apparatus 31a reproduces guidance for directions in which a user can proceed from the location of that reference point. The user can select his moving direction after he listens to guide voice, for example, on objects existing in the course he can take.

The voice data storage part 5 can be implemented in an exchangeable construction, using a storage medium such as an IC memory card. In the storage medium such as an IC memory card, there may be stored a guide voice or the like (for example, a guide voice in a foreign language, detailed guide voice, or guide voice for a visually handicapped person), being related to an ID signal for reproduction and a combination of a reference-point ID signal and a direction ID signal. Depending on purposes etc., desired voice data stored in such a storage medium may be read out, or a storage medium may be exchanged for another one storing desired voice data before the apparatus is supplied to a user.

The voice reproduction system of the present invention is embodied by installing the transmitting units 32 in a plurality of locations within an area of a theme park or the like. Lack of even one of the transmitting units 32 obstructs presentation of the guide voice corresponding to a direction, or leading a user by guide voice. Thus, preferably, each transmitting unit may be provided with an auxiliary power supply as a backup of the power supply.

The power unit 33 shown in FIG. 4 supplies operating power for the transmitting unit 32 from a power supply part 16 such as an ordinary commercial power supply or a battery charger. In addition to the power supply part 16, there is provided an auxiliary power supply part 17 for backup. The power supply part 16 and the auxiliary power supply part 17 supply operating power for the transmitting unit 32 through a switch 15 and a power breakdown detection part 14.

Usually, operating power is supplied from the power supply part 16 to the transmitting unit 32. In a case where the power breakdown detection part 14 detects power breakdown or voltage reduction, the power breakdown detection part 14 changes the switch 15 to the auxiliary power supply part 17 so as to supply operating power from the auxiliary power supply part 17 to the transmitting unit 32. As the auxiliary power supply part 17, a battery charger, a private power generator, commercial power supply through another line or the like may be suitably selected and used.

Figure 5:
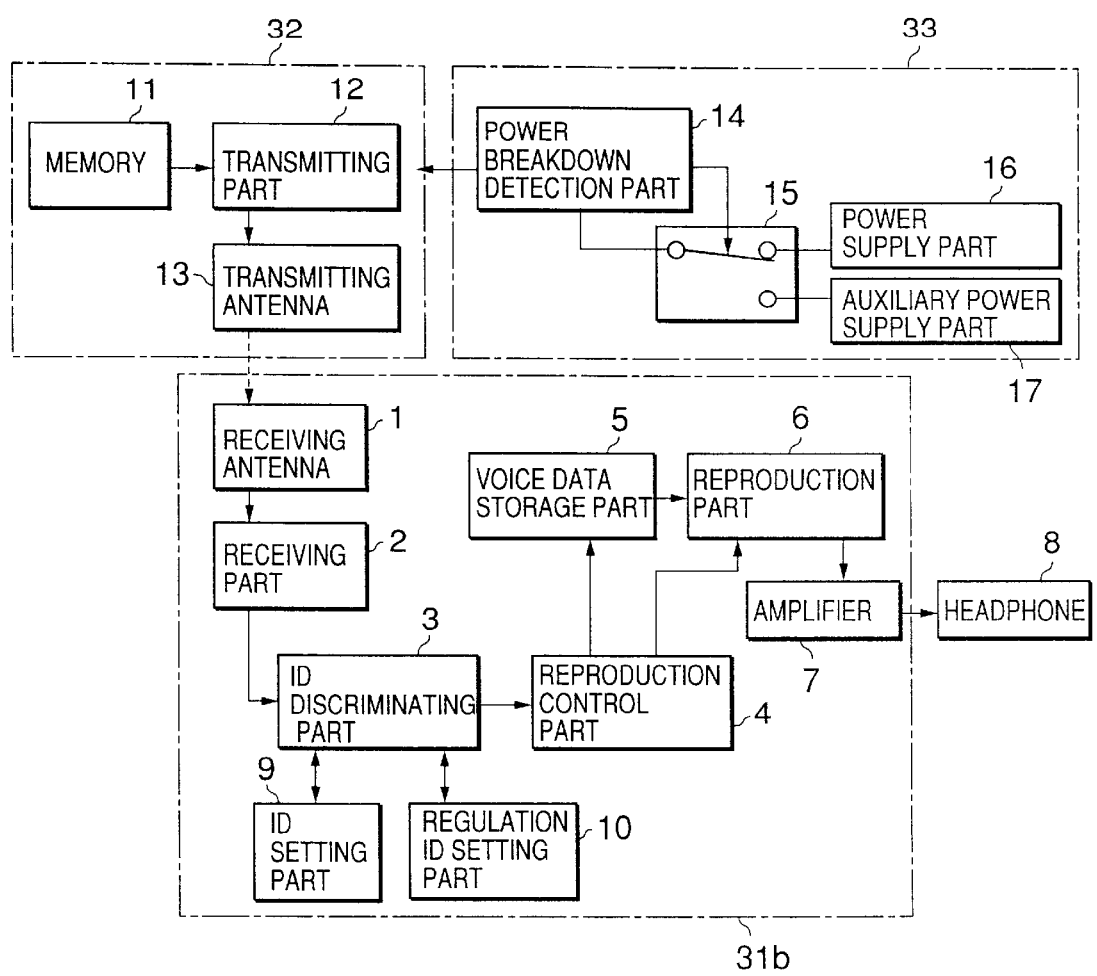
FIG. 5 is a block diagram showing another embodiment of the voice reproduction apparatus and voice reproduction system according to the present invention.

FIG. 5 is a block diagram showing another embodiment of the voice reproduction apparatus and voice reproduction system of the present invention. The transmitting unit 32 reads an ID signal from the memory 11 into the transmitting part 12, to transmit it through the transmitting antenna 13. The ID signal designates voice data such as music, an announcement, guide voice or the like to be reproduced by the voice reproduction apparatus in accordance with a guided site where the transmitting unit 32 is installed.

ID signals used in the present embodiment are an ID signal for reproduction for instructing reproduction, a reference-point identifying signal (reference-point ID signal) used as base positional information (reference-point information) for identifying a moving direction of a user of the voice reproduction apparatus 31b, and a direction identifying signal (direction ID signal) for indicating directional information in relation to the reference-point information.

In the voice reproduction apparatus 31b, an ID signal sent from the transmitting unit 32 is received by the receiving part 2 through the receiving antenna 1. The received signal is sent to the ID discriminating part 3 which discriminates an ID signal. The ID discriminating part 3 is connected with the ID setting part 9 and a regulation ID setting part 10, so as to discriminate an ID signal. The regulation ID setting part 10 sets and stores a received ID signal as a regulation ID signal. Here, a reference-point ID signal, which regulates a direction ID signal, is used as the regulation ID signal.

The ID discriminating part 3 judges if the received ID signal is an ID signal for reproduction, which gives an instruction of reproduction, a reference-point ID signal which regulates a direction ID stored and set in the regulation ID setting part 10, or a direction ID signal.

An ID signal discriminated in the ID discriminating part 3 is inputted into the reproduction control part 4. When the received signal is an ID signal for reproduction, the reproduction control part 4 selects voice data related to the received ID signal from among voice data stored in the voice data storage part 5 such as music, an announcement, guide voice or the like. The selected voice data is read at the reproduction part 6, amplified to a desired volume level in the amplifier 7, and reproduced and outputted through the headphone 8.

When the ID signal discriminated in the ID discriminating part 3 is a reference-point ID signal, then, from that time on, voice data which the reproduction control part 4 causes the voice data storage part 5 to output and reproduce is regulated in relation to a direction ID signal. In detail, when the voice reproduction apparatus 31b receives direction ID signal other than ones set in the regulation ID setting part 10 as reproducible in relation to the received reference-point ID signal in question, a reproduction instruction of the voice data related to the received direction ID signal is not outputted from the reproduction control part 4. Accordingly, the voice data is not outputted and reproduced from the voice data storage part 5. Until the regulation by the reference-point ID signal is cancelled, only following voice data is reproduced and outputted from the voice data storage part 5 through the reproduction part 6. Namely, that is the voice data corresponding to the voice control data set in the ID setting part 9 in relation to the direction ID signals which, in turn, are set in the regulation ID setting part 10 as reproducible in relation to the received reference-point ID signal.

When the ID signal discriminated in the ID discriminating part 3 is a direction ID signal and when this ID signal is a direction ID signal set in the regulation ID setting part 10 in relation to the previously received reference-point ID signal, the ID discriminating part 3 reads out voice control data stored and set in the ID setting part 9 in relation to this direction ID signal. Then, the ID discriminating part 3 instructs the reproduction control part 4 to reproduce the voice data stored in the voice data storage part 5 in relation to the voice control data in question. Thus, it is possible to reproduce an announcement, guide voice, music, or the like corresponding to a direction decided by the reference-point ID signal and the direction ID signal.

In a case where the voice reproduction apparatus 31b receives a direction ID signal before receiving a reference-point ID signal, it does not perform reproduction of a voice data corresponding to a user's moving direction.

It is set up so that voice data corresponding to a direction ID signal can be reproduced, when that direction ID signal is received after a reference-point ID signal is received and set and stored in the regulation ID setting part 10. From that time on, it is possible to perform voice reproduction according to a direction ID signal.

Here, a reference-point ID signal is set to regulate a direction ID signal for reproducing voice data. In addition, voice control data of ID signals for reproduction may be stored and set in the ID setting part 9, to reproduce it in relation to the reference-point ID signal. In that case, when a reference-point ID signal is received, the voice reproduction apparatus 31b reproduces guidance for directions in which a user can proceed from the location of that reference point. The user can select his moving direction after he listens to a guide voice, for example, on objects existing in the course he can take.

While reproduction is regulated by a reference-point ID signal, when a new reference-point ID signal is received, direction ID signals are newly set and stored in the regulation ID setting part 10 in relation to that newly-received reference-point ID signal.

While reproduction is regulated by a reference-point ID signal, a canceling ID signal for canceling the regulation set and stored in the regulation ID setting part 10 may be transmitted from a transmitting unit 32 installed at an exit or the like and received by the voice reproduction apparatus 31b. In that case, the voice reproduction apparatus 31b cancels setting of the regulation by the reproduction control part 4 on voice data outputted from the voice data storage part 5 of the voice reproduction apparatus 31*b* to the reproduction part 6 to be reproduced.

On the other hand, while reproduction is not regulated by a regulation ID signal, the voice reproduction apparatus 31*b* may receive a canceling ID signal, which is for canceling regulation, transmitted from a transmitting unit 32. In that case, regulation is neither set nor canceled, and the operating condition of the voice reproduction apparatus 31*b* is not changed.

The voice data storage part 5 can be implemented in an exchangeable construction, using a storage medium such as an IC memory card. In the storage medium such as an IC memory card, there may be stored a guide voice or the like (for example, a guide voice in a foreign language, detailed guide voice, or guide voice for a visually handicapped person), being related to an ID signal for reproduction and a combination of a reference-point ID signal and a direction ID signal. Depending on purposes etc., desired voice data stored in such a storage medium may be read out, or a storage medium may be exchanged for another one storing desired voice data before the apparatus is supplied to a user.

The voice reproduction system of the present invention is embodied by installing the transmitting units 32 in a plurality of locations within an area of a theme park or the like. Lack of even one of the transmitting units 32 obstructs presentation of a guide voice corresponding to a direction, or leading a user using a guide voice. Thus, preferably, each transmitting unit may be provided with an auxiliary power supply as a backup of the power supply.

The power unit 33 shown in FIG. 5 supplies operating power for the transmitting unit 32 from a power supply part 16 such as an ordinary commercial power supply or a battery charger. In addition to the power supply part 16, there is provided an auxiliary power supply part 17 for backup. The power supply part 16 and the auxiliary power supply part 17 supply operating power for the transmitting unit 32 through a switch 15 and a power breakdown detection part 14.

Usually, operating power is supplied from the power supply part 16 to the transmitting unit 32. In a case where the power breakdown detection part 14 detects power breakdown or voltage reduction, the power breakdown detection part 14 changes the switch 15 to the auxiliary power supply part 17 so as to supply operating power from the auxiliary power supply part 17 to the transmitting unit 32. As the auxiliary power supply part 17, a battery charger, a private power generator, commercial power supply through another line or the like may be suitably selected and used.

According to the voice reproduction apparatus and voice reproduction system of the present embodiment of the invention, it is possible to prevent malfunctioning and reproduction error, even in a case where an ID signal other than the regulated one is received due to interference.

Figure 6:
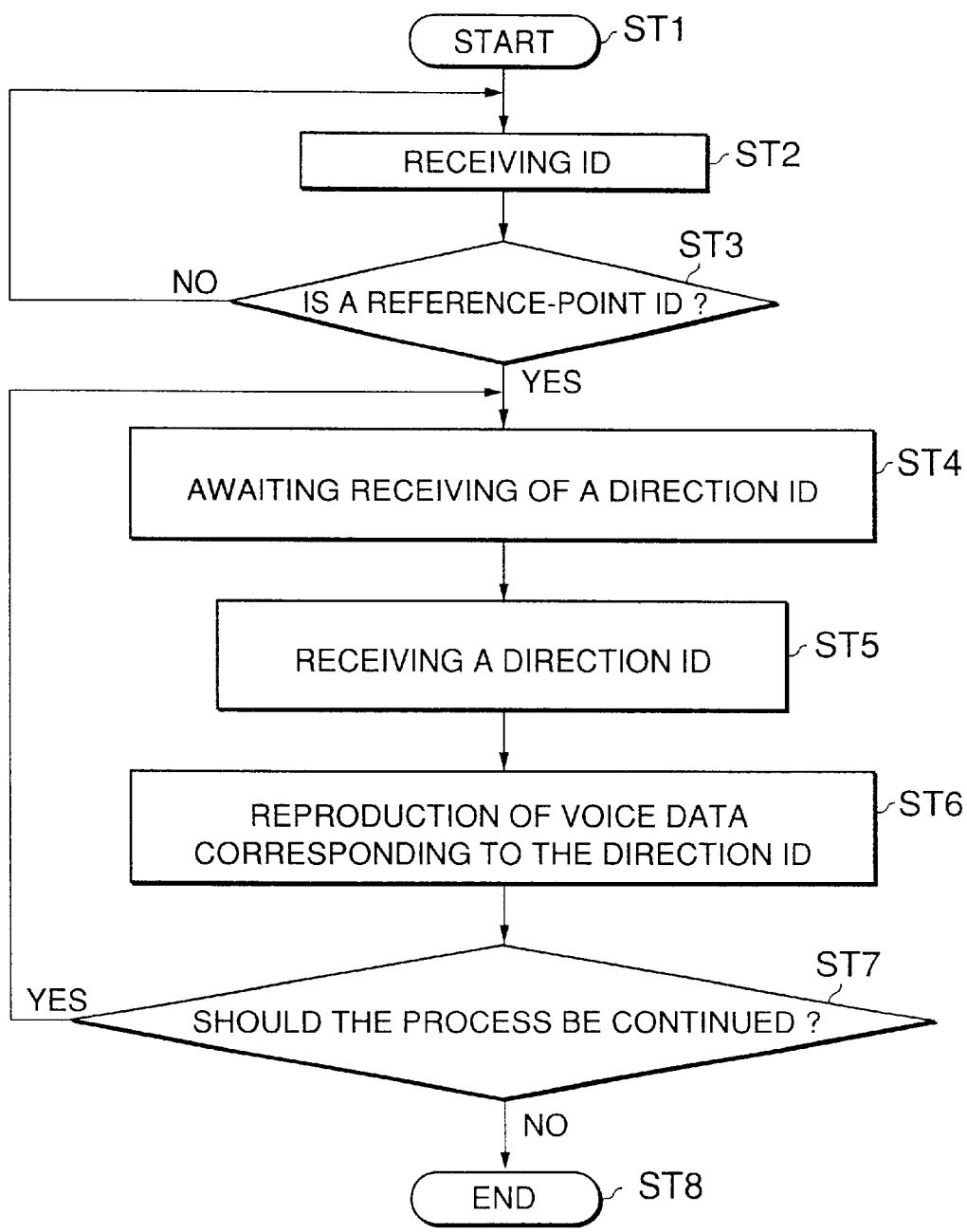
FIG. 6 is a flowchart showing another example of the operation of the voice reproduction apparatus of the present invention.

FIG. 6 is a flowchart showing another example of the operation of the voice reproduction apparatus of the present invention. When the process is started (ST1) and an ID signal is received (ST2), the received ID signal is judged in the ID discriminating part 3 (ST3). If the received ID signal is a reference-point ID signal (YES in ST3), the voice reproduction apparatus is put into an operating condition in which a direction ID signal is effective, and waits for receiving a direction ID signal (ST4).

When a direction ID signal is received (ST5), an instruction is sent to the reproduction control part 4 to reproduce voice data corresponding to voice control data set in the ID setting part 9 in relation to the direction ID signal, and the voice data in question is reproduced (ST6). If the process operation is to be continued (YES in ST7), the process returns to ST4 for waiting for a direction ID signal and the process is repeated. If the process operation is not to be continued (NO in ST7), the process is ended (ST8).

Figure 7:
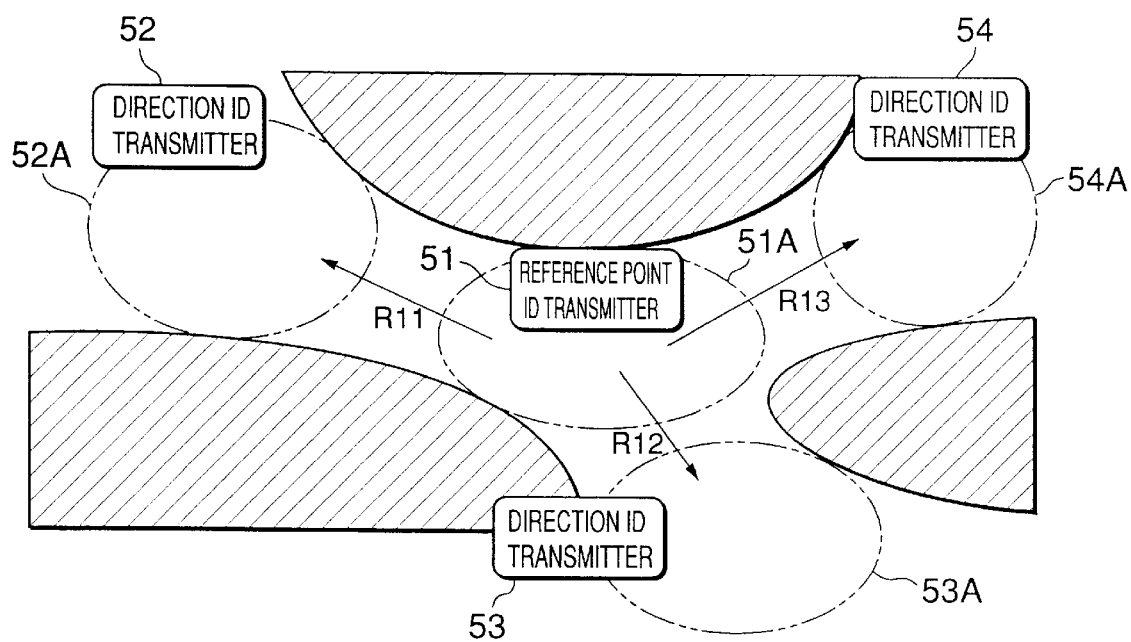
FIG. 7 is a schematic view showing another embodiment of the voice reproduction system of the present invention.

FIG. 7 is a schematic view showing another embodiment of the voice reproduction system of the present invention. This embodiment is for reproducing a guide voice corresponding to equipment in a theme park or the like. A reference-point ID transmitter 51 is provided in the center of branch of passage, and direction ID transmitters 52, 53, 54 are provided in passages in respective branching directions. Here, circles 51A, 52A, 53A, 54A shown in the figure illustrate transmission areas of the transmitters 51, 52, 53, 54, respectively.

Now, it is assumed that a user carrying a voice reproduction apparatus 31*a* or 31*b* is present within the transmission area 51A of the reference-point ID transmitter 51 installed in the center of the passage in the site. From the transmission area 51A of the reference-point ID transmitter 51, the passage branches in three directions shown by arrows R11, R12 and R13.

Moving in the direction of the arrow R11 will lead into the transmission area 52A of the direction ID transmitter 52. Moving in the direction of the arrow R12 will lead into the transmission area 53A of the direction ID transmitter 53. Moving in the direction of the arrow R13 will lead into the transmission area 54A of the direction ID transmitter 54.

If the user enters through an entrance and arrives at the reference-point ID transmission area 51A as the first reference-point ID transmission area, he has passed through any one of the direction ID transmission areas 52A, 53A and 54A. However, according to the direction ID signal of the direction ID transmitter 52, 53 or 54, reproduction operation of the voice reproduction apparatus 31*a* or 31*b* is not performed. When the user reaches the reference-point ID transmission area 51A, the voice reproduction apparatus 31*a* or 31*b* receives the reference-point ID signal.

When, the user in the reference-point ID transmission area 51A then proceeds in the direction of the arrow R11, he enters the direction ID transmission area 52A of the ID transmitter 52. The voice reproduction apparatus 31*a* or 31*b* receives the direction ID signal of the direction ID transmitter 52, and reproduces voice data such as a guide voice along the moving direction of the arrow R11 according to the previously-received reference-point ID signal and this direction ID signal.

When the user in the reference-point ID transmission area 51A goes in the direction of the arrow R12 or the arrow R13, he enters the ID transmission area 53A or 54A of the direction ID transmitter 53 or 54, in the same manner as the arrow R11. In that case, the voice reproduction apparatus 31*a* or 31*b* receives the direction ID signal of the direction ID transmitter 53 or 54. Then, the voice reproduction apparatus 31*a* or 31*b* reproduces voice data such as a guide voice along the moving direction of the arrow R12 or R13, based on the previously-received reference-point ID signal and this direction ID signal.

By applying the embodiment shown in FIG. 7 to a plurality of branch points of passages, and installing a reference-point ID transmitter in each branch point to set a reference-point ID transmission area, it is possible to provide a guide voice along a moving direction of a passage for a user carrying a voice reproduction apparatus.

When a voice reproduction apparatus 31*a* or 31*b* receives a reference-point ID signal, the reference-point ID signal is stored and an operating condition of detecting a direction ID signal, in which that reference-point ID signal is used as the basis of direction, is maintained until another reference-point ID signal is received. When a user enters another branch point of the passage, and the voice reproduction apparatus 31a or 31b receives another reference-point ID signal, the voice reproduction apparatus 31a or 31b stores the newly-received reference-point ID signal, and switches to operating condition of detecting a direction ID signal, in which the new reference-point ID signal is used as a basis of a direction.

A user may be provided with a voice reproduction apparatus in which guides or explanations along a user's moving direction, i.e., guides or explanations on objects existing ahead in the moving direction or on landmarks on the way, are set in advance, so that the user is led to a desired direction.

When a user walks within a site such as a theme park, carrying the voice reproduction apparatus, the user can obtain a guide voice along a moving direction. Thus, through the guide voice, the user himself can know in which direction he is walking.

According to the voice reproduction apparatus and voice reproduction system of the present embodiment of the invention, it is possible to provide voice data such as a guide corresponding to a user's moving direction.

Further, according to the voice reproduction apparatus and voice reproduction system of the present embodiment of the invention, it is possible to provide voice data such as a guide which leads a user in his desired moving direction.

According to the voice reproduction apparatus and voice reproduction system of the present invention, it is possible to reproduce voice data corresponding to a user's moving direction to lead him, employing a voice reproduction apparatus which reproduces voice data, which is stored in a storage part in advance, being related to an identifying signal received.

According to the voice reproduction apparatus and voice reproduction system of the present invention, even when they are used by a visually handicapped person, the visually handicapped person can recognize their moving direction using the voice data.

As described above, according to the present invention, a voice reproduction apparatus and voice reproduction system can reproduce voice data in accordance with a user's moving direction.

According to the present invention, it is possible to prevent reproduction errors caused by interference in a voice reproduction apparatus and voice reproduction system.

What is claimed is:

1. A voice reproduction apparatus, comprising:
   a receiving part for receiving an identifying signal;
   an identifying signal discriminating part for discriminating whether said identifying signal received by said receiving part is a reproduction identifying signal or a direction identifying signal;
   a voice data storage part for storing a plurality of voice data, each voice data corresponding to a combination of a previous direction identifying signal received previously by said receiving part and a subsequent direction identifying signal received by said receiving part subsequently to said previous direction identifying signal;
   a voice reproduction part for reproducing said voice data stored in said voice data storage part; and
   a reproduction control part for controlling reproduction when said identifying signal discriminating part discriminates that said previous direction identifying signal and said subsequent direction identifying signal received by said receiving part are said direction identifying signals so that said voice reproduction part reproduces a voice data stored in said voice data storage part in correspondence to a combination of said direction identifying signals discriminated by said identifying signal discriminating part.

2. A voice reproduction apparatus, comprising:
   a receiving part for receiving an identifying signal;
   an identifying signal discriminating part for judging if a previous identifying signal received previously by said receiving part is a reference-point identifying signal for setting a reference point, and if a subsequently received identifying signal is a direction identifying signal for indicating a direction;
   a voice data storage part for storing a plurality of voice data, each voice data corresponding to a combination of said reference-point identifying signal and said direction identifying signal;
   a voice reproduction part for reproducing said voice data stored in said voice data storage part; and
   a reproduction control part for controlling reproduction so that said voice reproduction part reproduces a voice data stored in said voice data storage part, corresponding to a combination of said reference-point identifying signal and said direction identifying signal, said combination being discriminated by said identifying signal discriminating part.

3. A voice reproduction apparatus, comprising:
   a receiving part for receiving an identifying signal;
   an identifying signal discriminating part for judging if a previous identifying signal received previously by said receiving part is a reference-point identifying signal which regulates a direction identifying signal for indicating a direction and which sets a reference point, and judging if a direction identifying signal subsequently received by said receiving part is said direction identifying signal regulated by said reference-point identifying signal or not;
   a voice data storage part for storing a plurality of voice data, each voice data corresponding to a combination of said reference-point identifying signal and said direction identifying signal regulated by said reference-point identifying signal;
   a voice reproduction part for reproducing said voice data stored in said voice data storage part; and
   a reproduction control part for controlling reproduction so that said voice reproduction part reproduces a voice data stored in said voice data storage part in correspondence with a combination of said reference-point identifying signal and said direction identifying signal regulated by said reference-point identifying signal, said combination being discriminated by said identifying signal discriminating part.

4. The voice reproduction apparatus according to any one of claims 1–3, wherein a detachable storage medium is used as said voice data storage part.

5. A voice reproduction system, comprising:
   a plurality of transmitting units, each for transmitting an identifying signal, each of said transmitting units transmits a reproduction identifying signal for instructing reproduction of voice data and a direction identifying signal for identifying a direction; and
   a voice reproduction apparatus for receiving said identifying signals transmitted from said transmitting units;

wherein, said voice reproduction apparatus comprises:

a receiving part for receiving said identifying signal;

an identifying signal discriminating part for discriminating whether said identifying signal received by said receiving part is said reproduction identifying signal or said direction identifying signal;

a voice data storage part for storing a plurality of voice data, each voice data corresponding to said combination of a previous direction identifying signal received previously by said receiving part and a subsequent direction identifying signal received by said receiving part subsequently to said previous direction identifying signal;

a voice reproduction part for reproducing said voice data stored in said voice data storage part; and a reproduction control part for controlling reproduction when said identifying signal discriminating part discriminates that said previous direction identifying signal and said subsequent direction identifying signal received by said receiving part are said direction identifying signals so that said voice reproduction part reproduces a voice data stored in said voice data storage part in correspondence with a combination of said direction identifying signals discriminated by said identifying signal discriminating part.

6. A voice reproduction system, comprising:

a reference-point transmitting unit transmitting a reference-point identifying signal that is an identifying signal for setting a reference point;

a plurality of direction transmitting units, each transmitting a direction identifying signal that is an identifying signal for indicating a direction; and a voice reproduction apparatus for receiving said reference-point identifying signal transmitted from said reference-point transmitting unit and said direction identifying signal transmitted from said direction transmitting units;

wherein, said voice reproduction apparatus comprising:

a receiving part for receiving said identifying signals;

an identifying signal discriminating part for judging if a previous identifying signal previously received by said receiving part is said reference-point identifying signal and if a subsequent identifying signal subsequently received by said receiving part is said direction identifying signal;

a voice data storage part for storing a plurality of voice data, each voice data corresponding to a combination of said reference-point identifying signal and said direction identifying signal;

a voice reproduction part for reproducing said voice data stored in said voice data storage part; and a reproduction control part for controlling reproduction so that said voice reproduction part reproduces a voice data stored in said voice data storage part in correspondence with a combination of said reference-point identifying signal and said direction identifying signal, said combination being discriminated by said identifying signal discriminating part.

7. A voice reproduction system, comprising:

a plurality of direction transmitting units, each transmitting a direction identifying signal that is an identifying signal for indicating a direction;

a reference-point transmitting unit for transmitting a reference-point identifying signal that is an identifying signal for regulating said direction identifying signal and for setting a reference point; and a voice reproduction apparatus for receiving said reference-point identifying signal transmitted from said reference-point transmitting unit and said direction identifying signal transmitted from said direction transmitting units;

wherein, said voice reproduction apparatus comprises:

a receiving part for receiving said identifying signals;

an identifying signal discriminating part for judging if a previous identifying signal received previously by said receiving part is said reference-point identifying signal that regulates said direction identifying signal for identifying the direction and for setting the reference point, and judging if a subsequent direction identifying signal subsequently received by said receiving part is said direction identifying signal regulated by said reference-point identifying signal or not;

a voice data storage part for storing a plurality of voice data, each voice data corresponding to a combination of said reference-point identifying signal and said direction identifying signal regulated by said reference-point identifying signal;

a voice reproduction part for reproducing said voice data stored in said voice data storage part; and a reproduction control part for controlling reproduction so that said voice reproduction part reproduces a voice data stored in said voice data storage part in correspondence with a combination of said reference-point identifying signal and said direction identifying signal regulated by said reference-point identifying signal, said combination being discriminated by said identifying signal discriminating part.

8. The voice reproduction system according to claim 5, further comprising a power unit for supplying electric power for said transmitting units, wherein:

said power unit comprises: a power supply part; an auxiliary power supply part; a power breakdown detection part for detecting power breakdown or voltage reduction in said power supply part; and a switching part for switching between said power supply part and said auxiliary power supply part; and said system is controlled so that said switching part is switched from said power supply part to said auxiliary power supply part, when said power breakdown detection part detects power breakdown or voltage reduction in said power supply part.

9. The voice reproduction system according to claim 6 or 7, further comprising a power unit for supplying electric power for said reference-point transmitting unit and said direction transmitting units, wherein:

said power unit comprises: a power supply part; an auxiliary power supply part; a power breakdown detection part for detecting power breakdown or voltage reduction in said power supply part; and a switching part for switching between said power supply part and said auxiliary power supply part; and said system is controlled so that said switching part is switched from said power supply part to said auxiliary power supply part, when said power breakdown detection part detects power breakdown or voltage reduction in said power supply part.

10. The voice reproduction system according to any one of claims 5–8, wherein a detachable storage medium is used as said voice data storage part.

11. The voice reproduction system according to claim 6 or 7, further comprising a power unit for supplying electric power for said reference-point transmitting unit and said direction transmitting units, wherein:

said power unit comprises: a power supply part; an auxiliary power supply part; a power breakdown detection part for detecting power breakdown or voltage reduction in said power supply part; and a switching part for switching between said power supply part and said auxiliary power supply part;

said system is controlled so that said switching part is switched from said power supply part to said auxiliary power supply part, when said power breakdown detection part detects power breakdown or voltage reduction in said power supply part, and a detachable storage medium is used as said voice data storage part.

* * * * *